United States Patent Office 3,431,119
Patented Mar. 4, 1969

3,431,119
PROCESS FOR THE DEHYDRATION OF SUB-
STANCES OF ANIMAL OR VEGETABLE
ORIGIN
Henri Griffon, 2 Place Mazas, Paris, France
No Drawing. Continuation of application Ser. No.
261,484, Feb. 27, 1963. This application Aug. 31,
1967, Ser. No. 664,887
Claims priority, application France, Feb. 27, 1962,
889,306, Patent 1,323,626; Jan. 28, 1963, 922,812
U.S. Cl. 99—204                                  8 Claims
Int. Cl. A23b 7/02

ABSTRACT OF THE DISCLOSURE

A substance of vegetable or animal origin is dehydrated by mixing finely divided particles of the food with less than 50 percent, calculated on dry solids, of starch and sufficient water to form a fluid creamy mixture which is then spread into a thin layer about 2 mm. thick and dehydrated to 6–15 percent moisture content with a current of air at a temperature such that the temperature of the mixture during drying does not exceed 37° C.

This application is a continuation of copending application Ser. No. 261,484 filed on Feb. 27, 1963, now abandoned.

This invention relates to a process for the dehydration of substances of animal or vegetable origin, and products resulting therefrom.

The present invention relates to a process for dehydrating varied substances, which has the advantage that it can be readily applied with the use of simple equipment, and which does not involve the use of any chemical products for the preservation of the substances and gives products of relatively low cost. Also, it is possible by means of this process to obtain dry products which preserve the constituents of the initial products without any appreciable modification and which, under the action of an appropriate rehydration, reproduce these initial products with their organoleptic properties substantially unchanged.

This process, although having a very wide field of application, is applicable notably to substances of animal or vegetable origin which are employed in foodstuffs, dietetics and pharmacy provided that the said substances can be brought into the state of a suspension-emulsion having the form of a homogeneous pasty mixture of creamy consistency, in which the constituent fragments of the said suspension-emulsion are impalpable to the touch.

Many perishable products are used today for the most part in their fresh state, e.g., dairy products, such as fresh cheese. Other products of animal origin, e.g., the flesh and organs of butchered animals, fowl and fish, and vegetables and fresh fruit, must be used in conjunction with cold storage, which requires refrigeration equipment. Other substances, like certain vegetable extracts, or those resulting from the hydrolysis of biological products, are obtained in a pasty hydrated form which is difficult to use. All these substances may advantageously be dehydrated by the dehydrating process according to the present invention.

The process according to the invention consists in preparing by malaxation or crushing, with the addition of the quantity of water necessary, a fluid suspension-emulsion of fine particles of the substance to be dehydrated which contains amylaceous substances, e.g., starch, and subjecting the fluid mixture thus obtained in the form of a continuous thin sheet, to a current of air or of inert gas, the temperature of which is so low that the temperature of the treated substance does not throughout the operation, substantially exceed 37° C., until the residual water content is reduced to the desired value, for example until the emulsion is dried to the solid state.

The manner in which the initial mixture of the substance to be dehydrated is first prepared may vary in accordance with the form of the physical chemical structure of this substance.

Starch is employed in the crude state, i.e. in its natural form, before any heat treatment which is likely to convert it into starch paste and thus deprive it of its hygroscopic properties.

The crushing and malaxating operations are carried out without the addition of foaming products and without injection of air, so as to obtain a paste rather than a foam which contains little if any occluded air and which is sufficiently fluid to be spread in thin layers.

The following variations may be employed in forming the mixture to be dehydrated:

(a) When the substance is homogeneous by constitution and has the consistency of a fine paste, for example, no prior preparation is necessary before the starch is incorporated therein by malaxation.

(b) When the substance is in the form of a firm homogeneous paste which would be very difficult to mix or even impossible to mix intimately with the starch, a quantity of water is added to the said substance so as to fluidify it, this addition being particularly easy when the substance is miscible with water or soluble in water.

(c) When the substance is heterogeneous, as in the case of animal or vegetable tissues or organs, it is necessary to subject said substance to a homogenizing crushing capable of dispersing the substance in the form of the finest possible particles. For obtaining this result, it is advantageous to use centrifugal crushers rotating at high speed, adding to the substance a certain proportion of water so as to facilitate the operation and to avoid any temperature increase of the substance above 37° C. under the influence of the crushing. It is moreover indicated to cool the substance in the course of the crushing so that its temperature is constantly below about 37° C.

The substance to be treated, when it is in the form of a homogeneous paste, either naturally or as a result of a prior preparation, is mixed with starch, which will generally be added in a proportion of the same order of magnitude as that of the substance to be treated, calculated on the dry material. For example, crude starch can be added to the substance to be dehydrated in a proportion such that the total proportion of amylaceous materials in the mixture is between 20 and 50 percent of the dry weight of the substance to be dehydrated. The mixture of starch and substance to be treated is malaxated until an intimate and homogeneous mixture of pasty consistency is obtained.

If the substance to be dehydrated itself contains amylaceous materials, the proportion thereof must be taken into consideration in the calculation of the quantity of starch which must be added. It may even be that the proportion of amylaceous materials contained initially in the substance is such that the addition of starch is unnecessary in the process. This will be the case especially with bananas.

In addition, it is to be noted that the acidity of some vegetable media inhibits the swelling of the starch during the mixing prior to the drying, whereas its favorable action in the dehydration step appears to be attributable to said swelling. Consequently, it is possible to reduce the proportion of starch added in the case of acid products.

Moreover, the quantity of water to be added during the crushing depends essentially upon the substance treated, e.g., being the proportion of water already contained in the substance in the natural state, and the viscosity of the paste obtained after crushing. This quantity will be so chosen in each instance as to favor the crushing and to obtain a good spreading in a thin layer on the support surfaces of the dehydrating apparatus.

Thus, it is unnecessary to add water in the case of certain fruits (for example tomatoes and strawberries), whereas this addition may be desirable in various proportions in the case of a number of products.

This mixture is thereafter treated in accordance with the invention by bringing it into the form of a continuous thin layer which is then washed by a current of air—or inert gas—at low temperature. For example, such a thin layer may be produced by spreading the paste on smooth plates, or better still on a smooth endless belt of water-repelling material, such as a synthetic resin, so as to produce a continuous dehydration. The current of drying air is so directed as to play upon the free surface of the sheet of pasty mixture. The dehydration is consequently the result of a surface evaporation effect. The thinner the layer, the more rapid is the dehydration (at equal temperature), but too thin a layer results in the dehydration taking place too quickly. Experience has shown that good results are obtained with a thickness of the order of 2 mm. or even less.

The temperature of the drying gases—which must necessarily be at an appropriate moisture content—must be regulated to a low value such that the temperature of the material does not substantially exceed 37° C. at any time during the dehydration, this treatment being continued until the residual water content is sufficiently low for the mixture to be capable of reduction to a dry powder.

Thus, the organoleptic properties of the substance are not modified and the starch added is not converted into a starch paste in situ.

With unstable substances, one can use dry drying air whose temperature is maintained below 37° C., thereby ensuring good preservation of its properties. However, it is possible with some substances and in certain phases of the process, to use air heated at a temperature a little above 37° C., whereby it is possible to accelerate the dehydration, provided that the temperature of the material itself does not, at least substantially, exceed this value. It is thus possible to make use of the fact that the evaporation of the treated material produces a temperature drop and employ drying air at a temperature above 37° C. in those parts of the apparatus in which the evaporation is sufficiently rapid for the temperature of the material to remain below the chosen temperature.

This will be the case especially at the beginning of the dehydrating operation, when the material being treated has a high water content, and for example when the operation is carried out in vacuo. Under these conditions, the temperature of the air could reach 50° C. and even slightly more, it being understood that the temperature of the air in contact with the material must be reduced and progressively brought to about 37° C. as the material loses its water and its own temperature approaches that of the current of gas.

For this purpose, if the process is continuously carried out, the direction of the currents of drying air or gas will preferably be transverse in relation to the direction of movement of the sheet of substance undergoing treatment, so that the succesive temperatures of the air can be adjusted at will as the dehydration progresses to avoid undesirable temperature rises in the material.

It is to be noted that the temperature difference between the material and the air depends not only upon the quantity of water which it contains, but also upon various other factors, namely the thickness of the thin layer of material subjected to the action of the drying air, the degree of vacuum employed when the process is carried out in vacuo, the speed of travel of the substance through the apparatus, the speed of the current of drying gas and its moisture content. However, in all cases, even when it is difficult to determine in advance by calculation the maximum temperatures of the air in the various phases of the treatment, the temperature of the material can always readily be measured and consequently the temperature and the speed of the gas current can always be readily adjusted.

For example, heat-sensitive probes may be placed in the material to control automatically the devices used for adjusting the temperature of the drying air, thus affording complete safety in the prevention of accidental local overheating.

The dehydration resulting from the application of the present process is obtained owing to the hygroscopicity and the absorbent properties of starch especially for fatty substances. In a first phase, in the course of the preparation of the mixture, the starch swells and absorbs water of constitution, while promoting the dispersion of the substance intimately mixed therewith. In a second phase, which consists in the consecutive drying under the influence of the current of air or inert gas, the mixture gives up this water in the form of vapour until the water content of the substance is in equilibrium with the environment of the drying gas under the experimental conditions produced, this content generally being between 6 and 15%.

At the end of the dehydrating process, the layer of treated substance, whose thickness was initially 2 mm., is converted into a fine film of about 0.2 mm. in thickness. If, as has been stated above, the support of this layer consists of a water-repelling material, the substance becomes readily detached therefrom in the form of a thin wafer or film. The latter may be reduced to the form of flakes, scales or powder by any appropriate mechanical means, such as more or less intense crushing, optionally followed by screening.

The final product obtained is substantially balanced in regard to its residual water content with the hygrometric state of the atmosphere. It can generally be stored or distributed in various packings. However, in the case of some products it may be desirable to use hermetically sealed packages affording protection against humidity and light.

According to the invention the starch which is to be used is crude starch, i.e. in its natural state, which has not been "gelatinized" by cooking. Gelatinized starches are not used in the process of this invention because they do not readily dehydrate, because they stick to the support member so that separation therefrom is difficult and because the dehydrated powder cannot be restored to the original material with all its intrinsic properties.

Starches which may be used include starch from tubers, e.g., potato starch, or from cereal grains, e.g., wheat, maize and rice. It is also possible to use seeds of Leguminosae (for example peas and beans) or of any other origin (for example bananas) which can be used in the form of flours. This use is particularly advantageous in cases where the product to be dehydrated will ultimately be used mixed with such a flour. The starch may be the commercial type, i.e., undehydrated, or dehydrated or a "soluble" starch.

By "soluble" starch is meant starch treated by known processes (for example oxidation in an acid or basic medium) to render it water soluble, even when heated in water, without the formation of starch paste.

In the majority of cases, for purely economic reasons, it is more advantageous to use undehydrated starch as normally commercially obtainable.

In some cases, it may be advantageous to use starch which has previously been dehydrated. In this case, the mixture with the substance to be dehydrated is freed, before any drying operation, from the percentage of water which would have been introduced by the undried starch.

In other cases, it may equally be advantageous to use so-called "soluble" starch. This is the case especially with substances intended to be used with an addition of water after heating or baking. The use of so-called soluble starch then avoids the formation of starch paste which, although desirable in some cases, may be undesirable in others. This will be the case, for example, in the preparation of autolysate powders intended to be used in the preparation of clear broths. On the other hand, ordinary starch will be used in the preparation of powders to be used for the production of thick soups. The proportions of starch to be employed with each type of substance to be dehydrated depends upon a number of factors related mainly to its nature, to its composition and to its physical and chemical structure. The most important of the factors connected with chemical composition is the water content, and in some cases, the fatty substance content.

The invention will be more readily understood with the aid of the following examples, which are given by way of indication and without limitation.

EXAMPLE 1

Initially homogeneous products having sufficiently fluid form to be mixed with starch by malaxation without requiring any prior preparation of the said product.

Fresh cheese, Swiss type, containing 40% of fatty substance and 30% of dry substance.

100 parts of fresh cheese are malaxated with 30 parts of maize starch until a homogeneous paste of smooth texture is obtained. This paste is spread in the drying apparatus and subjected to the action of a current of air heated at 35–37° C. until the residual water content is balanced to about 10%. The resultant product is thereafter reduced to a fine powder by appropriate crushing.

EXAMPLE 2

Initially homogeneous products, but not having sufficiently fluid form to be mixed with starch by malaxation and requiring prior preparation by addition of water.

Yeast autolysate, which is a commercial product in the form of a brown substance of firm pasty consistency, which sticks to the fingers and is hygroscopic, and the water content of which is about 20%. 100 parts of this product are mixed with 15 parts of water, whereby a paste of relatively fluid consistency is obtained. 80 parts of maize starch are incorporated in this paste, whereafter it is malaxated and dried as indicated in the foregoing. After crushing, there is obtained a pulverous product whose water content is established between 7% and 10%.

EXAMPLE 3

Heterogeneous products requiring prior preparation before mixing with starch.

Animal tissues or organs such as the flesh of fish, chicken, embryos or animal organs.

100 parts of substance to be treated in admixture with 35 parts of water are crushed to produce a homogeneous pasty mixture of creamy texture. There are then incorporated 35 parts of maize, starch and the mixture is malaxated until a homogeneous smooth paste is obtained. Drying is then effected as before to a water content of about 9 percent and the product is pulverized by grinding.

EXAMPLE 4

Heterogeneous products requiring prior preparation before being mixed with starch.

Vegetable products such as carrots.

100 parts of carrots admixed with 50 parts of water are so crushed as to produce a homogeneous pasty mixture of creamy texture. 40 parts of dehydrated maize starch are incorporated and the mixture is malaxated to produce a homogeneous smooth paste, which is dried as before.

EXAMPLE 5

Products containing a substantial proportion of amylaceous substances, such as banana.

100 parts of banana mixed with about 25 parts of water are crushed. The product is malaxated until a smooth homogeneous paste is obtained, which is dried as before.

EXAMPLE 6

Acid products, such as tomato.

In this particular case, 100 grams of tomato are ground (without any water having to be added, since this fruit contains sufficient water) with 2 grams of maize starch, which corresponds on average to 20–30% of dry substance.

The process for the dehydration of the most varied substances according to the invention has a number of advantageous and novel features as compared with the known processes.

From the technical, commercial and industrial viewpoints, it uses only simple equipment and the dehydrated products obtained therefrom are consequently of low cost.

From the viewpoint of the quality of the products obtained, the use of the dispersion of the substance to be dehydrated by means of starch is of very great advantage by reason of the remarkable properties of this substance, since starch performs a protective anti-oxidant function on the most fragile constituents of the substances to be dehydrated.

It is to be noted that the aforesaid dehydrating treatment was carried out at low temperature, and that the starch has undergone no heating and therefore possesses all the initial properties of natural or "soluble" starch in the finished product (for example powder or flakes).

Moreover, the presence of starch in the dry product containing about 10% of residual water ensures balancing of this water content with the atmospheric humidity in the dried product obtained, which permits good preservation of the product without its being necessary, in many cases, to use fluid-tight packings.

In addition, a remarkable bacteriological purity of the product obtained is observed, which is explained on the one hand by the fact that the temperature is maintained throughout the treatment below the temperatures at which excessive proliferations of microorganisms would be produced, and on the other hand due to the fact that the quick dehydration of the paste lowers the moisture content to such a low degree that this prevents microbial growth.

Finally, the absorbent properties of starch on fatty substances make it possible to dehydrate substances containing high proportions of fatty matter, such as, for example, certain dairy products, notably fresh cheese, and pork butchery products. These products, which are mentioned by way of example, could not be dehydrated by any other process without danger of separation of the fatty matter by exudation.

The dehydrated products obtained by the process according to the invention take the form of flakes, scales or powder, of which the organoleptic properties, colour, flavour and odour correspond to those of the original products. The volatile constituents (aromas) are preserved notably by reason of its absorbent properties.

The dehydrated products may be directly employed in this form. This is the case, for example, with flakes and powders, which can be used in the preparation of soups. The extremely highly divided form of the proteinaceous constituents, such as fish or fowl flesh, enables them to be almost instantly cooked in the presence of an appropriate quantity of water and thus with a very small consumption of thermal energy.

They may also be rehydrated in the cold by the addition of an appropriate quantity of water. They will then undergo a regeneration which restores to them the organoleptic properties of the initial substance before dehydration.

Finally, these products keep remarkably well even without special precautions, but it may be preferable in some cases to keep and store them in fluid-tight receptacles, cases or packings by which they are protected from moisture and light. However, the starch which they contain protects them from any physical chemical modifications which may result from the absorption of moisture, which can take place only in very limited proportions, and which does not result in any appreciable modification of the texture of the product.

What is claimed is:

1. In a process for the dehydration of substances of vegetable or animal origin capable of being formed into a suspension-emulsion comprising the steps of (a) preparing, by malaxation or crushing, a mixture of the substance to be dehydrated and an amylaceous material, (b) forming the mixture thus obtained into a sheet and (c) drying the sheet, the improvement which comprises:

(i) using a non-gelatinized form of the amylaceous material in an amount such that the amylaceous content of the mixture does not exceed 50 percent of the dry solids content of the substance to be dehydrated;

(ii) preparing the mixture in the presence of an amount of water such that a fluid suspension or emulsion of a creamy consistency which can be spread into a thin layer is produced;

(iii) spreading the fluid mixture into a thin layer of about 2 mm. thickness; and (iv) drying the thin layer to a residual moisture content between 6 and 15 percent, with a current of air or inert gas at a temperature such that the temperature of the substance being dehydrated does not, throughout the drying step, exceed 37° C.

2. Process according to claim 1 wherein crude starch is added to the substance to be dehydrated during the mixing step.

3. Process according to claim 1 wherein crude starch is added in an amount such that the amylaceous content of the mixture is between 20 and 50 percent of the dry weight of the substance to be dehydrated.

4. Process according to claim 1 wherein the substance to be dehydrated is first subjected to crushing with the addition of a quantity of water sufficient to produce a homogeneous paste and is thereafter malaxated with starch.

5. Process according to claim 1 wherein during the crushing and/or malaxating operations, the treated mixture is cooled so that its temperature does not exceed about 37° C.

6. Process according to claim 1 wherein the thin sheet is continuously moved during the drying step and is dried by a current of drying gas traveling in a direction perpendicular to the travel of the thin sheet.

7. Process according to claim 1 wherein the dehydration is continued to a residual moisture content between 8 and 12 percent.

8. In a process for the dehydration of a vegetable or fruit capable of being formed into a suspension-emulsion comprising the steps of (a) preparing by malaxation or crushing, a mixture of the vegetable or fruit and starch, (b) forming the mixture thus obtained into a sheet, and (c) drying the sheet with a current of air or inert gas, the improvement which comprises (i) using non-gelatinized starch in an amount such that the amylaceous content of the mixture is between 20 and 50 percent of the dry weight of the vegetable or fruit to be dehydrated;

(ii) maintaining the temperature of the vegetable or fruit during the crushing or malaxation operations at a temperature not exceeding 37° C.;

(iii) forming the mixture of vegetable or fruit to be dehydrated and starch in the presence of an amount of water whereby the mixture is formed in the mixing operation as a fluid suspension or emulsion of a creamy consistency which can be spread into a thin layer;

(iv) spreading the resulting fluid mixture into a continuous thin layer of about 2 mm. thickness; and (v) drying the layer as a continuous moving sheet to a moisture content between 8 and 12 percent, with a current of heated air at a temperature such that the mixture being dehydrated does not, throughout the drying step, exceed 37° C.

References Cited

UNITED STATES PATENTS

| 572,906 | 11/1897 | Gere | 99—204 |
| 472,644 | 4/1892 | Saville | 99—204 |
| 233,473 | 10/1880 | Cassidy | 99—204 |

RAYMOND N. JONES, *Primary Examiner.*

S. B. DAVIS, *Assistant Examiner.*

U.S. Cl. X.R.

99—199, 208